United States Patent [19]
Watanabe et al.

[11] Patent Number: 5,841,927
[45] Date of Patent: Nov. 24, 1998

[54] OPTICAL WAVEGUIDE DEVICE AND OPTICAL WAVEGUIDE APPARATUS

[75] Inventors: Junko Watanabe; Hironao Hakogi; Akiko Tanno, all of Kawasaki; Toshihiro Otani; Shinya Sawae, both of Sapporo, all of Japan

[73] Assignee: Fujitsu Limited, Kawasaki, Japan

[21] Appl. No.: 306,892

[22] Filed: Sep. 16, 1994

[30] Foreign Application Priority Data

Sep. 20, 1993 [JP] Japan ................................. 5-233063

[51] Int. Cl.⁶ ...................................................... G02B 6/10
[52] U.S. Cl. ............................................ 385/129; 385/130
[58] Field of Search ................................. 385/129, 130, 385/131, 132, 135, 137; 156/901, 902; 224/901

[56] References Cited

U.S. PATENT DOCUMENTS 5,042,895  8/1991  Chouinard et al. ..................... 385/132

*Primary Examiner*—Rodney B. Bovernick
*Assistant Examiner*—Robert E. Wise
*Attorney, Agent, or Firm*—Armstrong, Westerman, Hattori, McLeland & Naughton

[57] ABSTRACT

A crystal substrate, with an adhesive uniformly applied to its entire rear surface, is fixed to the inner wall of an element housing. By adjusting the thickness of a wall of the element housing, forming grooves in the wall, or fixedly attaching a deadweight to the wall, the resonant frequency of the element housing is adjusted so as to restrain the optical waveguide element from resonating. Further, by mounting the optical waveguide device on a printed board via an elastic member or the like, propagation of the vibration to it is suppressed.

16 Claims, 13 Drawing Sheets

OPTICAL WAVEGUIDE DEVICE AND OPTICAL WAVEGUIDE APPARATUS

BACKGROUND OF THE INVENTION

1. Field of the Invention

The present invention generally relates to an optical waveguide device constructed with an optical waveguide element, produced by forming an optical waveguide on the surface of a dielectric crystal substrate, incorporated in an element housing and an optical wave guide apparatus constructed with such an optical waveguide device mounted on a device mounting board or with such a board mounting the device thereon incorporated in an apparatus housing and, more particularly, to countermeasures against occurrence of variations in characteristics and malfunctions of the optical waveguide element caused by a vibration due to an impulse or the like propagated to the optical waveguide element.

2. Description of the Related Art

An optical waveguide element produced by forming an optical waveguide on the surface of a dielectric crystal substrate of lithium niobate ($LiNbO_3$), lithium tantalate ($LiTaO_3$), or the like by thermal diffusion of a metal (such as Ti) or an oxide of the metal to the surface has low loss and wide band characteristics and further has a feature that it can be mass-produced by using the planar technique. Therefore, there have been made wide researches on and developments of the optical waveguide elements and some of them have been brought up to the practical level. Especially those optical waveguide elements, such as optical switches or optical modulators, produced by disposing a pair of electrodes correspondently to an optical waveguide arrangement on a dielectric crystal substrate and enabled to perform switching operation or modulating operation by adjusting the refractive index of the optical waveguide by controlling the voltage applied to the electrodes are being paid keen attention because of their high speed characteristic.

As optical waveguide elements of the described type, optical switches or optical modulators of Y branch type, cross (X) type, directional coupler type, Mach-Zehnder type (branch and interference type), and balanced bridge type are known.

The Y branch type optical switch is a 1×2 switch adapted to perform switching operation by having the refractive index at the branch portion of the optical waveguide controlled by an applied voltage and having the branching ratio thereby changed. A 1×N matrix switch can be obtained by arranging the same in cascade connection. The cross (X) type optical switch is a 2×2 switch adapted to perform switching operation by diffraction, total reflection, or mode interference obtained by having the refractive index at the crossing portion of the optical waveguides controlled by an applied voltage. An N×N matrix switch can be obtained by arranging the same in cascade connection.

The directional coupler type optical switch is a 2×2switch controlling the phase difference between two optical waveguides, which governs the optical power transfer occurring when the two parallel optical waveguides are close to each other, through a variation in the refractive index caused by an applied voltage. An N×N matrix switch can also be obtained by arranging the same in cascade connection.

The Mach-Zehnder type optical modulator is such that has two optical waveguides with both ends coupled with each other and, therein, the refractive indexes of the two optical waveguides are made different from each other by an applied voltage so that a phase difference may be produced between two lightwaves passed through one branch and an interference between the lightwaves is produced when they are coupled together and, thereby, the modulating operation is performed.

The balanced bridge type optical switch is that constitutes a 2×2 optical switch by having the directional coupler type and the Mach-Zehnder type combined, and its operating principle is the same as that of the Mach-Zehnder type.

The optical waveguide element as described above is generally incorporated in an element housing for the sake of its coupling with an optical fiber and protection of it by having a portion of it fixed to the inner wall of the housing with an adhesive or the like. Sometimes, an optical waveguide element is fixed to a fixing plate and the fixing plate is fixed to the inner wall of an element housing by spot welding or the like.

Herein, a structure with an optical waveguide element incorporated in an element housing will be called "optical waveguide device". The optical waveguide device will then be mounted on a devise mounting board, such as a printed board, together with other devices and, further, such a printed board or the like will be incorporated in an apparatus housing to provide an optical communication apparatus or the like. Herein, such a structure with an optical waveguide device mounted on a printed board or the like, or a structure with such a printed board or the like incorporated in an apparatus housing, will be called "optical waveguide apparatus".

Now, taking a Mach-Zehnder type optical modulator as an example, its details will be described. Thermal diffusion of titan is applied to the surface of a substrate of a Z-cut lithium niobate crystal to increase the refractive index and, thereby, a pair of optical waveguides coupled with each other in the vicinity of both their ends are formed. Over the same, a buffer layer of $SiO_2$ is formed, and over the buffer layer, a pair of metallic electrodes are formed correspondently to the pair of optical waveguides. One of the pair of electrodes is a signal controlling electrode and the other is a grounding electrode.

Incident light from one end of the optical waveguide is split and enter the pair of optical waveguides. When a drive voltage is applied to the electrode, a phase difference is produced between the split lightwaves by the electro-optic effect. (Since the directions of the electric fields at the pair of optical waveguides are opposite to each other, their refractive indexes vary in the opposite directions.) Both the lightwaves are coupled again and taken out as an optical signal output. By controlling the drive voltage and causing the phase difference between both the split lightwaves by the electro-optic effect to become zero or $\pi$, for example, an on-off digital signal can be obtained.

In such an optical waveguide element, the dielectric crystal substrate of lithium niobate, lithium tantalate, or the like presents various effects such as pyro-electric effect, piezoelectric effect, and photoelastic effect, in addition to the electro-optic effect. Hence, there arises a problem due to the photoelastic effect, i.e., a problem caused by production of a mechanical strain within the crystal accompanied by a change in the refractive index proportional to the magnitude of the strain. Namely, when a vibration due to an impulse or the like is given to an optical waveguide element, there arises such a problem that the refractive index of the optical waveguide is changed due to the mechanical strain produced within the dielectric crystal substrate and, thereby, characteristics of the optical waveguide element are deteriorated and sometimes the optical waveguide element becomes unable to perform its operation as desired.

More specifically, taking the above described Mach-Zehnder type optical modulator as an example, since the pair of optical waveguides are close to each other, when a vibration or the like is applied to them, it produces strains of the same magnitude in them and, hence, the refractive indexes are changed in the same direction. While the relationship between the optical output characteristics and the applied voltage, when the applied voltage is taken along the axis of abscissas and the optical output is taken along the axis of ordinates, is expressed to be proportional to the square of a sine function, the strain due to a vibration or the like causes the optical output characteristic relative to the applied voltage to translate (drift) parallel to the axis of abscissas. Thus, a digital error sometimes occurs.

The drift due to the strain attenuates in time after giving rise to a standing wave produced in the optical waveguide element at the resonant frequency of the optical waveguide element and variations in the refractive index corresponding to the change in the direction, positive or negative, and the magnitude of the amplitude. While the drift is not a stationary phenomenon but that ceasing within a short period of time after occurrence of an impulse given to the optical waveguide element, the occurrence of the digital error by the described cause becomes a very serious problem when the optical waveguide element is used in very high speed and large capacity transmission of an optical signal.

The same thing also holds true for the case of analog signal transmission. It further holds true also for optical switches or optical modulators of the above described Y branch type, cross (X) type, directional coupler type, and balanced bridge type. Further, optical multiplexer/demultiplexers, mode converters, filters, spectrum analyzers, and so on using a crystal substrate having a photoelastic effect are also confronted by the same problem.

SUMMARY OF THE INVENTION

An object of the present invention is to make it possible, in an optical waveguide device constructed with an optical waveguide element, using a dielectric crystal substrate of a lithium niobate, lithium tantalate, or the like having the photoelastic effect, incorporated in an element housing, or an optical waveguide apparatus constructed with the optical waveguide device mounted on a device mounting board, such as a printed board, or with such a board mounting the device on it incorporated in an apparatus housing, to minimize occurrence of deteriorations in characteristics of the optical waveguide element even if a vibration due to an impulse or the like is given to the device or apparatus.

As countermeasures against the above mentioned difficulty, such means can be considered:

(A) to reduce the vibration amplitude of the optical waveguide element itself;

(B) to restrain the optical waveguide element from resonating; and (C) to attenuate a vibration caused by an impulse or the like so that it does not reach the optical waveguide element.

With these points taken into consideration, the present invention, in an optical waveguide device formed with an optical waveguide element, using a dielectric crystal substrate with a photoelastic effect such as lithium niobate and lithium tantalate, incorporated in an element housing or in an optical waveguide apparatus formed with the optical waveguide device mounted on a device mounting board, such as a printed board, or with such a board mounting the device on it incorporated in an element housing, the following designs have been made.

(A) Structures designed to reduce the vibration amplitude of the optical waveguide element itself:

(1) An optical waveguide device according to a first aspect of the invention comprises an optical waveguide element produced by forming an optical waveguide on the surface of a dielectric crystal substrate and an element housing having the optical waveguide element fixed to the inner wall of it with the entire rear surface of the optical waveguide element uniformly attached to the inner wall with an adhesive. As the adhesive, a general resin type adhesive or a silver-tin paste can be used.

Since the entire rear surface of the optical waveguide element is uniformly attached to the element housing, the optical waveguide element is prevented from vibrating independently of the element housing even when an external impulse or the like is given to the same and, hence, the vibration amplitude of the optical waveguide element becomes smaller than in the conventional case where the fixing was made by spot welding or the like.

(2) An optical waveguide device according to a second aspect of the invention comprises an optical waveguide element produced by forming an optical waveguide on the surface of a dielectric crystal substrate, a fixing plate having the optical waveguide element fixed to the front surface of it, and an element housing having the fixing plate fixed to the inner wall of it with the entire rear surface of the fixing plate uniformly attached to the inner wall with an adhesive. As the adhesive, a general resin type adhesive or a silver-tin paste can be used.

Since the entire rear surface of the fixing plate, to which the optical waveguide element is fixed, is uniformly attached to the element housing, the optical waveguide element including the fixing plate is prevented from vibrating independently of the element housing even when an external impulse or the like is given to the same and, hence, the vibration amplitude of the optical waveguide element becomes smaller than in the conventional case where the fixing was made by spot welding or the like.

(3) An optical waveguide device according to a third aspect of the invention comprises an optical waveguide element produced by forming an optical waveguide on the surface of a dielectric crystal substrate, a fixing plate having the optical waveguide element fixed to the front surface of it, and an element housing having the fixing plate fixed to the inner wall of it with the edge portion of the rear surface of the fixing plate continuously welded, all along the circumference, to the inner wall.

Since the edge portion of the rear surface of the fixing plate, to which the optical waveguide element is fixed, is continuously welded, all along the circumference, to the inner wall, the optical waveguide element including the fixing plate is prevented from vibrating independently of the element housing even when an external impulse or the like is given to the element housing and, hence, the vibration amplitude of the optical waveguide element becomes smaller than in the conventional case where the fixing was made by spot welding or the like.

(B) Structures designed to restrain the optical waveguide element from resonating:

(4) An optical waveguide device according to a fourth aspect of the invention comprises an optical waveguide element produced by forming an optical waveguide on the surface of a dielectric crystal substrate, and an element housing having a wall whose thickness is set so that the resonant frequency (natural frequency) of it differs from the resonant frequency of the optical waveguide element and having the optical waveguide element fixed to the inner surface of the wall.

Generally, when the frequency of an external force applied to a vibrating system comes close to the natural frequency of the vibrating system, a resonance takes place and the amplitude of the vibrating system increases. According to the above design, by suitably setting the thickness of the element housing, the resonant frequency of the element housing can be made different from the resonant frequency of the optical waveguide element and, thereby, the optical waveguide element is restrained from resonating.

(5) An optical waveguide device according to a fifth aspect of the invention comprises an optical waveguide element produced by forming an optical waveguide on the surface of a dielectric crystal substrate, a fixing plate whose thickness is set so that the resonant frequency of it differs from the resonant frequency of the optical waveguide element and having the optical waveguide element fixed to the front surface of it, and an element housing having the fixing plate fixed at its rear surface to the inner wall of it.

According to this design, the same as in the design of the fourth aspect of the invention, by suitably setting the thickness of the fixing plate, the resonant frequency of the element housing including the fixing plate can be made different from the resonant frequency of the optical waveguide element and, thereby, the optical waveguide element is restrained from resonating.

(6) An optical waveguide apparatus according to a sixth aspect of the invention comprises an optical waveguide device formed with an optical waveguide element, produced by forming an optical waveguide on the surface of a dielectric crystal substrate, fixed to the inner wall of an element housing and a device mounting board, whose thickness is set so that the resonant frequency of it differs from the resonant frequency of the optical waveguide device, having the optical waveguide device mounted on the front surface of it.

According to this design, the same as in the design of the fourth aspect of the invention, by suitably setting the thickness of the device mounting board, the resonant frequency of the optical waveguide device can be made different from the resonant frequency of the device mounting board and, thereby, the optical waveguide device is restrained from resonating.

(7) An optical waveguide device according to a seventh aspect of the invention comprises an optical waveguide element produced by forming an optical waveguide on the surface of a dielectric crystal substrate, and an element housing having a groove formed in its wall surface and having the optical waveguide element fixed to its inner wall.

According to this design, since the element housing has a groove, the frequency of the standing wave produced in the element housing when an external impulse is given to the same can be made higher. By suitably selecting the number of the grooves and its shape, a suitable frequency at which the optical waveguide element in the optical waveguide device is hardly affected by the impulse can be established.

(8) An optical waveguide apparatus according to an eighth aspect of the invention comprises an optical waveguide device formed with an optical waveguide element, produced by forming an optical waveguide on the surface of a dielectric crystal substrate, fixed to the inner wall of an element housing, and a device mounting board having a groove formed in one surface of it and having the optical waveguide device mounted on the other surface of it.

According to this design, since the device mounting board has a groove, the frequency of the standing wave produced in the device mounting board when an external impulse is given to the same can be made higher. By suitably selecting the number of the grooves and its shape, a suitable frequency at which the optical waveguide element in the optical waveguide device is hardly affected by the impulse can be established.

(9) An optical waveguide apparatus according to a ninth aspect of the invention comprises an optical waveguide device formed with an optical waveguide element, produced by forming an optical waveguide on the surface of a dielectric crystal substrate, fixed to the inner wall of an element housing, a device mounting board having the optical waveguide device mounted on it, and an apparatus housing having the device mounting board incorporated in it and having a groove formed in the wall surface of it.

According to this design, since the element housing has a groove, the frequency of the standing wave produced in the element housing when an external impulse is given to the same can be made higher. By suitably selecting the number of the grooves and its shape, a suitable frequency at which the optical waveguide element in the optical waveguide device is hardly affected by the impulse can be established.

(10) An optical waveguide device according to a 10th aspect of the invention comprises an optical waveguide element produced by forming an optical waveguide on the surface of a dielectric crystal substrate, an element housing having the optical waveguide element fixed to the inner wall of it, and a deadweight fixedly attached to the element housing.

According to this design, since a deadweight is attached to the element housing, the frequency of the standing wave produced in the element housing when an external impulse is given to the same can be made higher. By suitably selecting the weight of the deadweight, its mounting position, and the number of the deadweights, a suitable frequency at which the optical waveguide element in the optical waveguide device is hardly affected by the impulse can be established.

(11) An optical waveguide apparatus according to an 11th aspect of the invention comprises an optical waveguide device formed with an optical waveguide element, produced by forming an optical waveguide on the surface of a dielectric crystal substrate, fixed to the inner wall of an element housing, and a device mounting board having the optical waveguide device mounted on one surface of it and having a deadweight fixedly attached to the other surface of it.

According to this design, since a deadweight is attached to the device mounting board, the frequency of the standing wave produced in the device mounting board when an external impulse is given to the same can be made higher. By suitably selecting the weight of the deadweight, its mounting position, and the number of the deadweights, a suitable frequency at which the optical waveguide element in the optical waveguide device is hardly affected by the impulse can be established.

(C) Structures designs to attenuate a vibration caused by an impulse or the like so that it does not reach the optical waveguide element:

(12) An optical waveguide apparatus according to a 12th aspect of the invention comprises an optical waveguide device formed with an optical waveguide element, produced by forming an optical waveguide on the surface of a dielectric crystal substrate, fixed to the inner wall of an element housing, an elastic member with a damping effect having the optical waveguide device fixed to the front surface of it, and a device mounting board having the optical waveguide device mounted on it via the elastic member.

According to this design, a vibration due to an external impulse or the like is attenuated by the elastic member and prevented from reaching the optical waveguide element.

(13) An optical waveguide apparatus according to a 13th aspect of the invention comprises an optical waveguide device formed with an optical waveguide element, produced by forming an optical waveguide on the surface of a dielectric crystal substrate, incorporated in an element housing, a plurality of screws formed of an elastic material with a damping effect, and a device mounting board having the optical waveguide device fixed to it with the screws.

According to this design, a vibration due to an external impulse or the like is attenuated by the screws formed of an elastic material with a damping effect and prevented from reaching the optical waveguide element.

(14) An optical waveguide apparatus according to a 14th aspect of the invention comprises an optical waveguide device formed with an optical waveguide element, produced by forming an optical waveguide on the surface of a dielectric crystal substrate, incorporated in an element housing, a plurality of screws having a washer formed of an elastic material with a damping effect, and a device mounting board having the optical waveguide device fixed to it with the screws via the washer.

According to this design, a vibration due to an external impulse or the like is attenuated by the washers formed of an elastic material with a damping effect and prevented from reaching the optical waveguide element.

(15) An optical waveguide apparatus according to a 15th aspect of the invention comprises an optical waveguide device formed with an optical waveguide element, produced by forming an optical waveguide on the surface of a dielectric crystal substrate, fixed to the inner wall of an element housing, and a device mounting board supported at its edge portion on the inside of an apparatus housing and having the optical waveguide device mounted on it at a portion near the edge portion.

According to this design, since the optical waveguide device is mounted on a portion where the amplitude of the optical waveguide device is at the minimum, it is hardly affected by the vibration.

(16) An optical waveguide apparatus according to a 16th aspect of the invention comprises an optical waveguide device formed with an optical waveguide element, produced by forming an optical waveguide on the surface of a dielectric crystal substrate, fixed to the inner wall of an element housing, and a device mounting board having the optical waveguide device mounted on it such that the element housing is attached to it at its one side surface in such an attitude that propagation of a vibration due to an external impulse to it is minimized. By the selection of a suitable attitude of the optical waveguide device, it is hardly affected by the vibration.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1A:
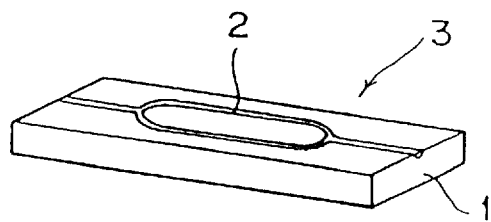
FIG. 1A and FIG. 1B are perspective views of an optical waveguide element showing a first embodiment of the invention.

Embodiments of the present invention will be described below with reference to the accompanying drawings. Throughout all the embodiments, component parts substantially the same will be denoted by like reference numerals and duplicate description will be partly omitted. The following first to sixteenth embodiments correspond to the above described first to sixteenth structures, respectively.

(A) Embodiments structured so as to reduce vibration amplitude of the optical waveguide element itself (first to third embodiments):

(1) First embodiment

Figure 1B:
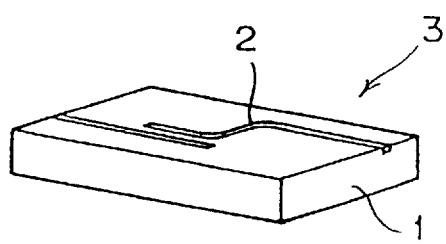
Figure 1C:
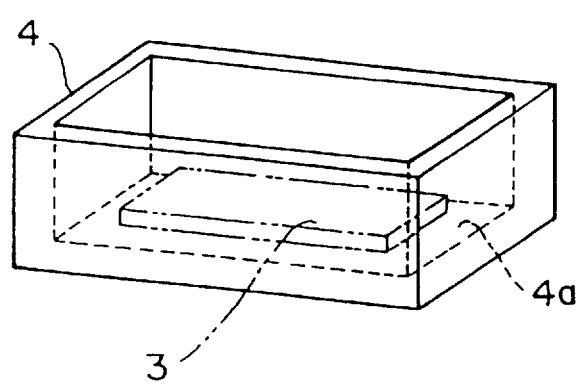
FIG. 1C is a perspective view of an optical waveguide device showing the first embodiment of the invention.

FIGS. 1A–1C are drawings explanatory of the first embodiment, of which FIG. 1A and FIG. 1B are perspective views showing optical waveguide elements and FIG. 1C is a perspective view showing the principal portion. Referring to FIG. 1A or FIG. 1B, reference numeral 1 denotes a dielectric crystal substrate of lithium niobate, lithium tantalate, or the like having a photoelastic effect. On the dielectric crystal substrate 1, there is formed an optical waveguide 2 by thermally diffusing a metal such as titanium or its oxide to a portion of the surface thereby increasing the refractive index at the portion. Though not shown, electrodes corresponding to the optical waveguide 2 and the like are formed according to the need to thereby construct an optical waveguide element 3. The optical waveguide element 3 is of such an elongated size as 50–60 mm long and 20 mm wide. FIG. 1 shows a Mach-Zehnder type optical modulator and FIG. 1B shows a directional coupler.

Such an optical waveguide element 3 is incorporated in an element housing (package) 4 as shown in FIG. 1C for the sake of coupling of it with an optical fiber and protection of the element. The optical waveguide element 3 is provided with an optical adhesive uniformly applied to the entire rear surface of it and firmly fixed by adhesion to the inner surface of the bottom wall 4a of the element housing 4. The opening at the top of the element housing 4 is closed by a lid or the like. The element housing 4 is of such an elongated size as 100 mm long, 20 mm wide, and 10 mm high.

(2) Second embodiment

Figure 2:
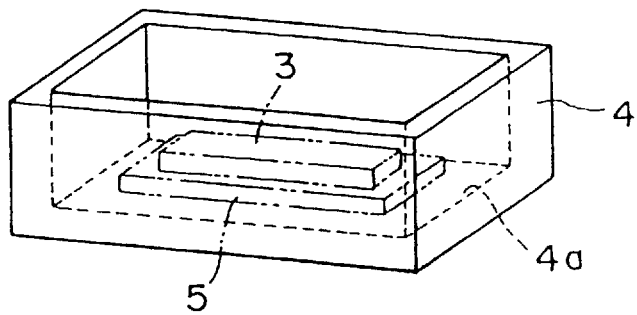
FIG. 2 is a perspective view of an optical waveguide device showing a second and a third embodiment of the invention.

Referring to FIG. 2, the optical waveguide element 3 in this embodiment is fixed to a fixing plate 5 and the fixing plate 5 is provided with an optical adhesive uniformly applied to the entire rear surface (the surface opposite to that on which the optical waveguide element 3 is fixed) and firmly fixed by adhesion to the inner surface of the bottom wall 4a of the element housing 4. As the material of the fixing plate 5, when for example the material of the dielectric crystal substrate 1 is lithium niobate, SUS 304 of which the coefficient of thermal expansion is close to that of the substrate is used.

(3) Third embodiment

Referring to FIG. 2, this embodiment is structured such that the optical waveguide element 3 is fixed to the fixing plate 5 and the fixing plate 5 is firmly fixed to the element housing 4 by welding continuously applied to the entire circumference of the rear surface (the surface opposite to that on which the optical waveguide element 3 is fixed) of the fixing plate 5, while the rear surface is kept in contact with the inner surface of the bottom wall 4a of the element housing 4. According to circumstances, the rear surface of the fixing plate 5 may be attached to the inner surface of the bottom wall 4a of the element housing 4 with an optical adhesive and then the welding may be performed to increase the fixing strength.

According to the above described first to third embodiments, since the entire rear surface of the optical waveguide element 3 or of the fixing plate 5 on which the optical waveguide element 3 is fixed is uniformly attached to the element housing, the optical waveguide element 3 or the optical waveguide element 3 including the fixing plate 5 is prevented from vibrating independently of the element housing 4 even when an external impulse or the like is given to the same and, hence, the vibration amplitude of the optical waveguide element 3 itself becomes smaller than in the conventional case where the fixing was made by spot welding or the like. Accordingly, the deterioration in characteristics due to an impulse or the like can be reduced and, in the case for example of the Mach-Zehnder type optical modulator, occurrence of the digital error can be reduced.

(B) Embodiments structured so as to restrain the optical waveguide element from resonating (fourth to eleventh embodiments):

(4) Fourth embodiment

Figure 3A:
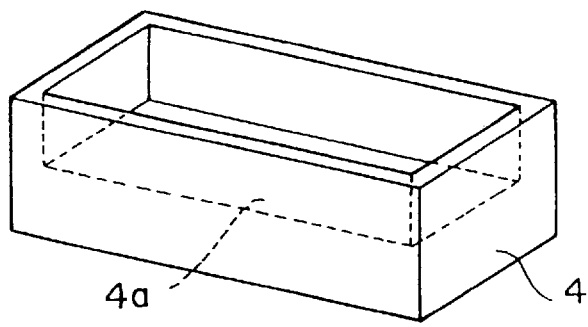
FIG. 3A and FIG. 3B are a perspective view and a plan view, respectively, of an element housing showing a fourth embodiment of the invention.
Figure 3B:
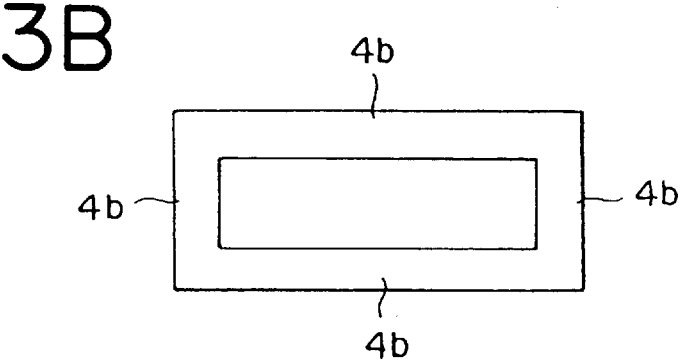
Figure 3C:
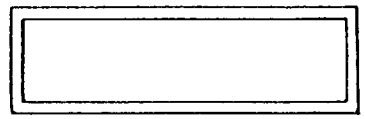
FIG. 3C is a plan view of a conventional element housing.

This embodiment is structured such that the bottom wall 4a of the element housing 4 is thicker than heretofore as shown in FIG. 3A or side walls 4b are thicker than heretofore (refer to FIG. 3C), as shown in FIG. 3B, and, thereby, the resonant frequency of the element housing 4 is set to be different from the resonant frequency of the optical waveguide element.

By adjusting the thickness of the bottom wall 4a or side walls 4b of the element housing 4 as described above, the optical waveguide element fixed to the bottom wall 4a of the element housing 4 is restrained from resonating and, hence, occurrence of a malfunction of the optical waveguide element can be reduced.

(5) Fifth embodiment

Figure 4:
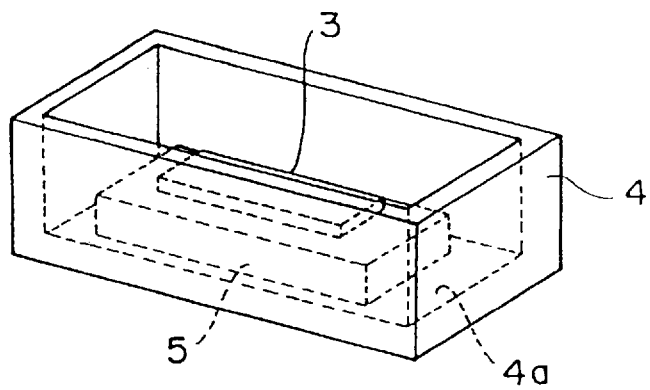
FIG. 4 is a perspective view of an optical waveguide device showing a fifth embodiment of the invention.

This embodiment is structured such that, when the optical waveguide element 3 is fixed to the inner surface of the bottom wall 4a of the element housing 4 via the fixing plate 5, the thickness of the fixing plate 5 is set to be thicker than heretofore as shown in FIG. 4 and, thereby, the resonant frequency of the element housing 4 including the fixing plate 5 is set to be different from the resonant frequency of the optical waveguide element 3.

By adjusting the thickness of the fixing plate 5, the optical waveguide element fixed to the inner surface of the bottom wall 4a of the element housing 4 is restrained from resonating and, hence, occurrence of a malfunction of the optical waveguide element can be reduced. The principle underlying the present embodiment is similar to that underlying the fourth embodiment.

(6) Sixth embodiment

Figure 5A:
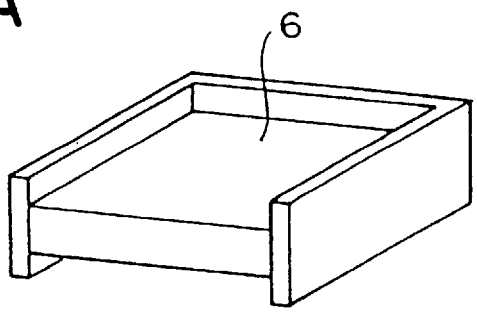
FIG. 5A is a perspective view of a device mounting board showing a sixth embodiment of the invention.
Figure 5B:
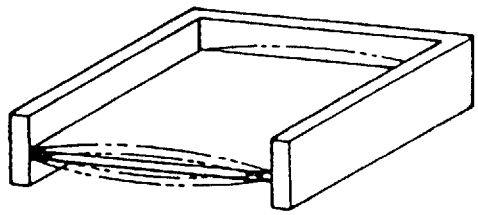
FIG. 5B is a perspective view of a conventional device mounting board.

This embodiment is structured such that the thickness of a device mounting board 6, such as a printed board, on which an optical waveguide device structured with an optical waveguide element incorporated in an element housing is mounted, or a surface plate constituting an apparatus housing (a housing of an optical communication apparatus or the like), is set to be thicker than heretofore (refer to FIG. 5B) as shown in FIG. 5A and, thereby, the resonant frequency of the optical waveguide device and the resonant frequency of the device mounting board are made different from each other.

By adjusting the thickness of the device mounting board, the optical waveguide device mounted on the device mounting board is restrained from resonating and, hence, the adversary effects of the vibration of the optical waveguide element incorporated in the optical waveguide device can be reduced. The principle underlying the present embodiment is similar to that underlying the fourth embodiment or the fifth embodiment.

(7) Seventh embodiment

Figure 6A:
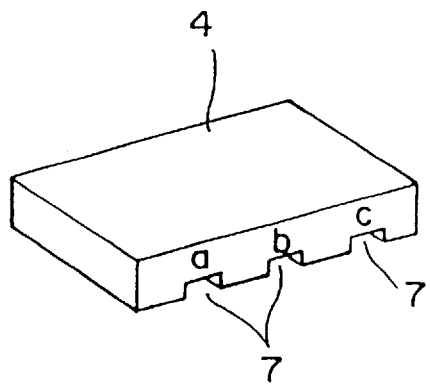
FIG. 6A and FIG. 6B are a perspective view and a front view, respectively, of an optical waveguide device showing a seventh embodiment of the invention.
Figure 6B:
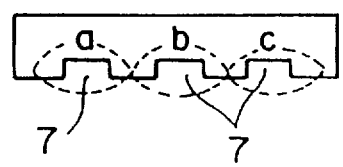

This embodiment, in an optical waveguide device formed with an optical waveguide element incorporated in an element housing 4, is such that has a plurality of grooves 7 formed in the outer walls of the element housing 4 as shown in FIG. 6A or FIG. 6B.

Figure 6C:
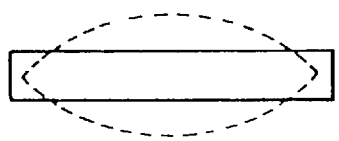
FIG. 6C is a front view of a conventional optical waveguide device.

According to the structure, since the element housing 4 has the grooves 7, the frequency of the standing wave produced in the element housing 4 when an external impulse or the like is given to the same can be made higher than that produced in the conventional type having no groove (refer to FIG. 6C). By suitably selecting the number of the grooves 7 and its shape, the frequency can be set to a suitable value at which the optical waveguide element in the optical waveguide device does not resonate. Thus, the adversary effects of the vibration of the optical waveguide element incorporated in the optical waveguide device can be reduced.

(8) Eighth embodiment

Figure 7A:
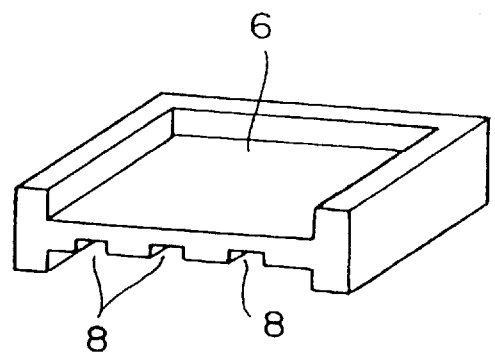
FIG. 7A and FIG. 7B are a perspective view and a front view, respectively, of a device mounting board showing an eighth embodiment of the invention.
Figure 7B:
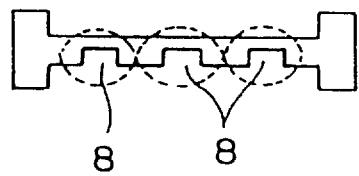

This embodiment is such that is provided with a plurality of grooves 8 formed in a device mounting board 6, such as a printed board, on which an optical waveguide device, formed with an optical waveguide element incorporated in an element housing, is mounted, as shown in FIG. 7A or FIG. 7B.

Figure 7C:
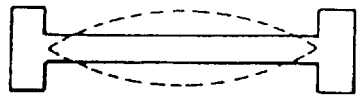
FIG. 7C is a front view of a conventional device mounting board.
Figure 8A:
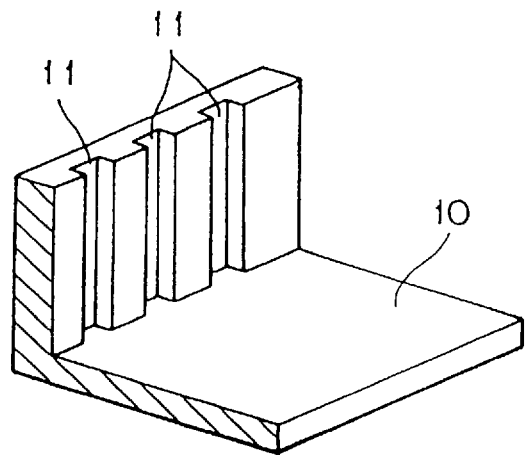
FIG. 8A and FIG. 8B are part drawings in perspective of an apparatus housing showing a ninth embodiment of the invention.
Figure 8B:
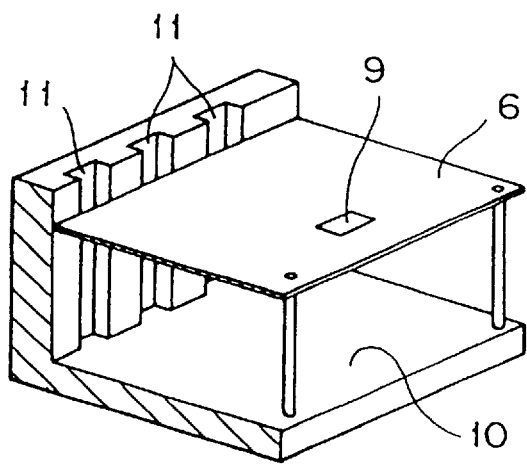

According to the structure, since the device mounting board 6 has the grooves 8, the frequency of the standing wave produced in the device mounting board 6 when an external impulse or the like is given to the same can be made higher than that produced in the conventional type having no groove (refer to FIG. 7C). By suitably selecting the number of the grooves 8 and its shape, the frequency can be set to a suitable value at which the optical waveguide element in the optical waveguide device does not resonate. Thus, the adversary effects of the vibration of the optical waveguide element incorporated in the optical waveguide device can be reduced. The principle underlying the present embodiment is similar to that underlying the seventh embodiment.

(9) Ninth embodiment

This embodiment is such that is provided with a plurality of grooves 11 formed in the outer walls of an apparatus housing (a housing of an optical communication apparatus or the like) 10 incorporating a device mounting board 6, such as a printed board, on which an optical waveguide device 9, formed with an optical waveguide element incorporated in an element housing, is mounted.

According to the structure, since the apparatus housing 10 has the grooves 11, the frequency of the standing wave produced in the apparatus housing 10 when an external impulse or the like is given to the same can be made higher than that produced in the conventional type having no groove. By suitably selecting the number of the grooves 11 and its shape, the frequency can be set to a suitable value at which the optical waveguide element in the optical waveguide device 9 mounted on the device mounting board 6 does not resonate. Thus, the adversary effects of the vibration of the optical waveguide element incorporated in the optical waveguide device 9 can be reduced. The principle underlying the present embodiment is similar to that underlying the seventh embodiment or eighth embodiment.

(10) 10th embodiment

Figure 9A:
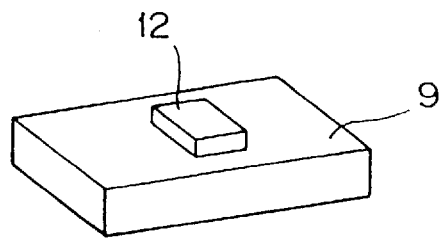
FIG. 9A and FIG. 9B are a perspective view and a front view, respectively, of an optical waveguide device showing a tenth embodiment of the invention.
Figure 9B:
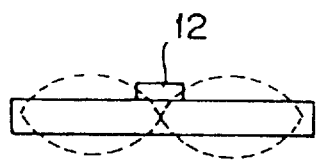

This embodiment is such that is provided with a deadweight 12 fixedly mounted on the outer wall of an element housing of an optical waveguide device 9, formed with an optical waveguide element incorporated in the element housing, as shown in FIG. 9A or FIG. 9B.

Figure 9C:
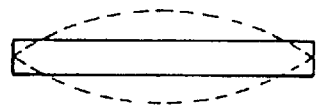
FIG. 9C is a front view showing a conventional optical waveguide device.
Figure 9D:
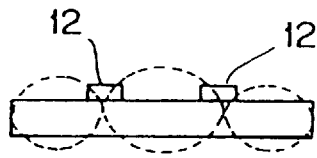
FIG. 9D is a front view showing a modified example of the optical waveguide device shown in FIG. 9B.

Since the deadweight 12 is attached to the element housing 4, the frequency of the standing wave produced in the element housing when an external impulse or the like is given to the same can be made higher than that produced in the conventional type having no deadweight (refer to FIG. 9C). By increasing the deadweights 12 in number as shown in FIG. 9D or suitably selecting the weight or the mounting position of the deadweight, the frequency can be set to a suitable value at which the optical waveguide element in the optical waveguide device 9 does not resonate. Thus, the adversary effects of the vibration of the optical waveguide element incorporated in the optical waveguide device 9 can be reduced.

(11) 11th embodiment

Figure 10A:
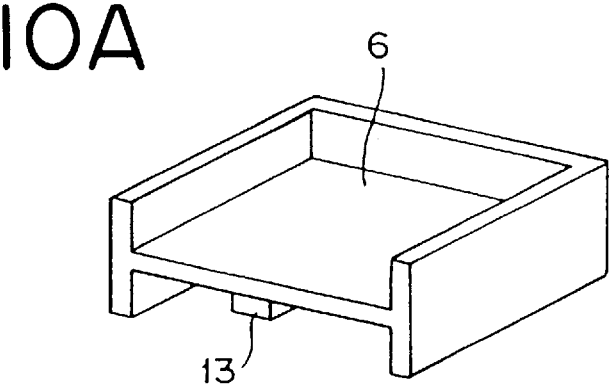
FIG. 10A and FIG. 10B are a perspective view and a front view, respectively, of a device mounting board showing an 11th embodiment of the invention.
Figure 10B:
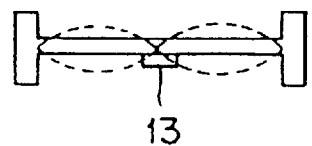

This embodiment is such that has a deadweight 13 fixedly attached to a device mounting board 6, such as a printed board, on which an optical waveguide device, formed with an optical waveguide element incorporated in an element housing, is mounted, as shown in FIG. 10 or FIG. 10B.

Figure 10C:
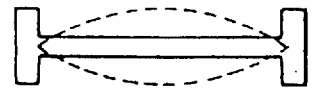
FIG. 10C is a front view of a conventional device mounting board.
Figure 10D:
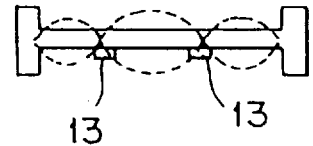
FIG. 10D is a front view showing a modified example of the device mounting board shown in FIG. 10B.

Since the device mounting board 6 is provided with a deadweight 13 attached to it, the frequency of the standing wave produced in the device mounting board 6 when an external impulse or the like is given to the same can be made higher than that produced in the conventional type having no deadweight (refer to FIG. 10C). By increasing the deadweights 13 in number as shown in FIG. 10D or suitably selecting the weight or the mounting position of the deadweight, the frequency can be set to a suitable value at which the optical waveguide element in the optical waveguide device does not resonate. Thus, the adversary effects of the vibration of the optical waveguide element incorporated in the optical waveguide device can be reduced. The principle underlying the present embodiment is similar to that underlying the above described 10th embodiment.

(C) Embodiments structured so that vibration due to impulse is attenuated and prevented from reaching the optical waveguide element (12th to 16th embodiments):

(12) 12th embodiment

Figure 11A:
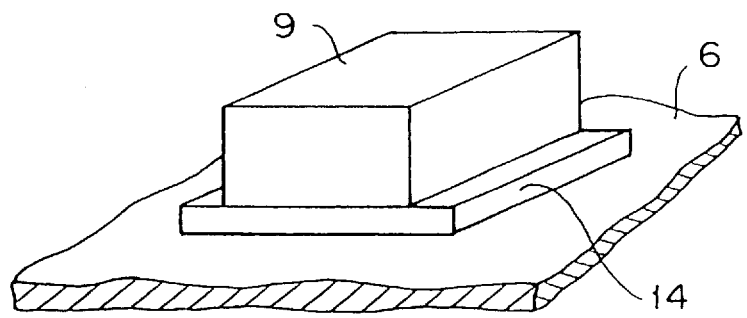
FIG. 11A is a perspective view of an apparatus showing a 12th embodiment of the invention.

This embodiment is such that has an optical waveguide device 9, formed with an optical waveguide element incorporated in an element housing, mounted on a device mounting board 6 via an elastic member 14 in a plate form having a damping effect, as shown in FIG. 11A.

According to the structure, a vibration due to an external impulse or the like is attenuated by the elastic member 14 and restrained from propagating to the optical waveguide device 9 and, consequently, it seldom reaches the optical waveguide element in the optical waveguide device 9. Thus, the adversary effects of the vibration of the optical waveguide element can be reduced.

(13) 13th embodiment

Figure 11B:
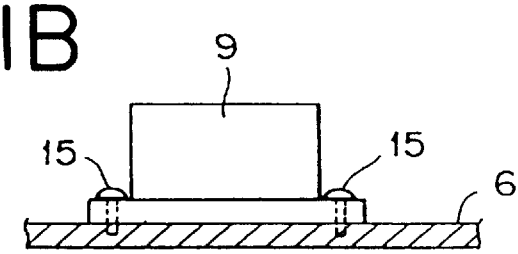
FIG. 11B is a front view of an apparatus showing a 13th embodiment of the invention.

This embodiment is such that has an optical waveguide device 9, formed with an optical waveguide element incorporated in an element housing, fixedly mounted on a device mounting board 6 with a plurality of screws 15 made of an elastic material having a damping effect, as shown in FIG. 11B.

According to the structure, a vibration due to an external impulse or the like is attenuated by the screws 15 and restrained from propagating to the optical waveguide device 9 and, consequently, it seldom reaches the optical waveguide element in the optical waveguide device 9. Thus, the adversary effects of the vibration of the optical waveguide element can be reduced. This embodiment, when combined with the above described 12th embodiment, becomes more effective.

(14) 14th embodiment

Figure 11C:
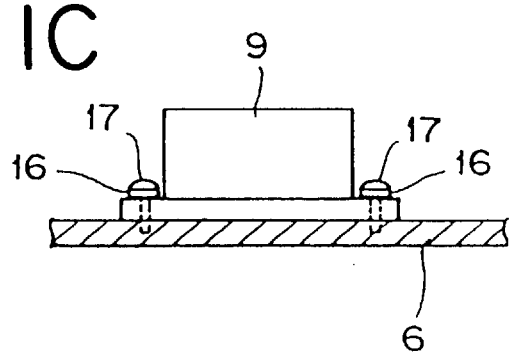
FIG. 11C is a front view of an apparatus showing a 14th embodiment of the invention.

This embodiment is such that has an optical waveguide device 9, formed with an optical waveguide element incorporated in an element housing, fixedly mounted on a device mounting board 6 with a plurality of screws 17 having a washer 16 made of an elastic material having a damping effect, as shown in FIG. 11C.

According to the structure, a vibration due to an external impulse or the like is attenuated by the washers 16 and restrained from propagating to the optical waveguide device 9 and, consequently, it seldom reaches the optical waveguide element in the optical waveguide device 9. Thus, the adversary effects of the vibration of the optical waveguide element can be reduced. This embodiment, when combined with the above described 12th embodiment, becomes more effective.

(15) 15th embodiment

Figure 12:
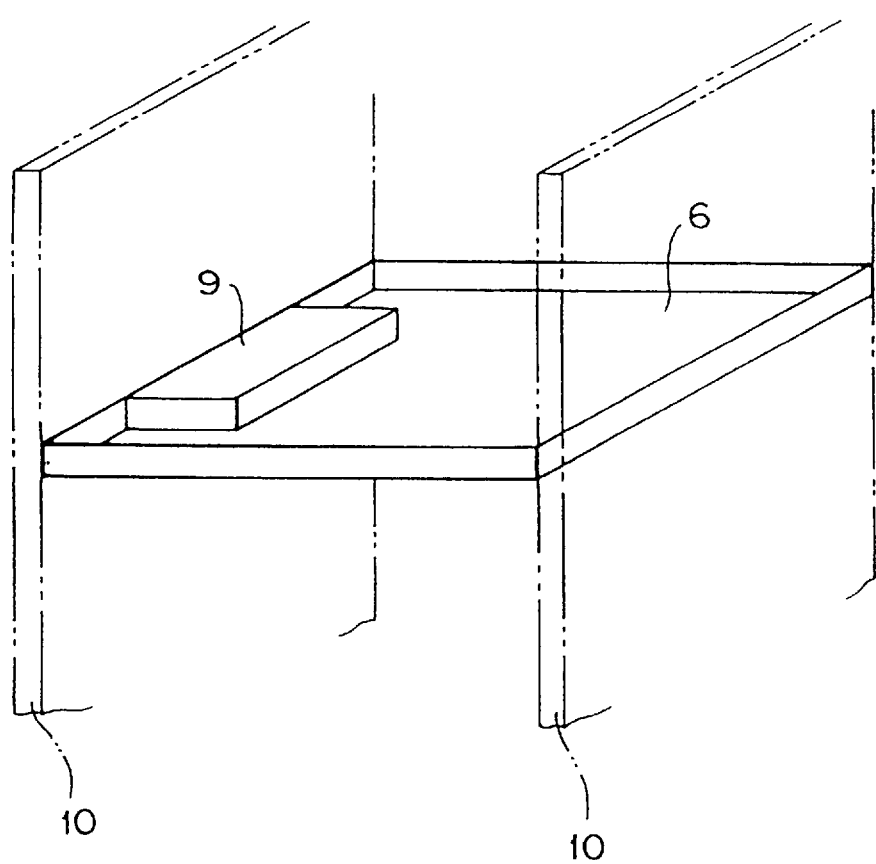
FIG. 12 is a part drawing in perspective of an optical waveguide apparatus showing a 15th embodiment of the invention.

As shown in FIG. 12, a device mounting board 6, such as a printed board, mounting an optical waveguide device on it is incorporated in an apparatus housing (a housing of an optical communication apparatus or the like) 10 by having its edge portion supported on the inside of the apparatus housing. The vibration amplitude of the device mounting board 6 is smaller in the vicinity of its supported portion than in the portion around the center far away from the supported portion. Accordingly, in this embodiment, the optical waveguide device 9 is mounted along the edge portion at which the device mounting board 6 is supported on the inside of the apparatus housing 10. Since this portion produces a smaller amplitude when subjected to an impulse or the like, the optical waveguide element in the optical waveguide device 9 is hardly affected by the impulse. Thus, the adversary effects of the vibration of the optical waveguide element can be reduced.

(16) 16th embodiment

Figure 13A:
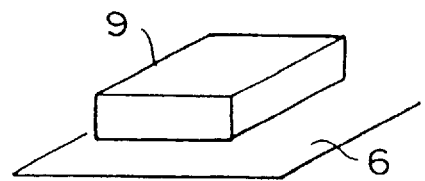
FIGS. 13A–13C are drawings explanatory of mounted attitudes of an optical waveguide device showing a 16th embodiment of the invention.
Figure 13B:
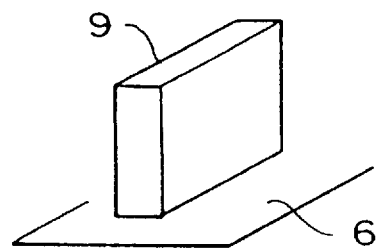
Figure 13C:
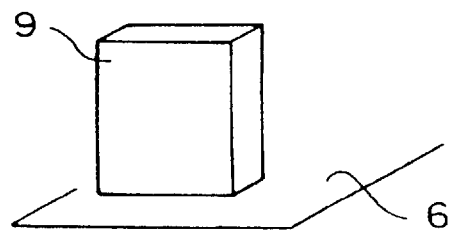

As attitudes of an optical waveguide device when it is mounted on a device mounting board 6 such as a printed board, three attitudes can be considered as shown in FIGS. 13A–13C. In this embodiment, the optical waveguide device 9 is mounted on the device mounting board 6 in such an attitude as to minimize the propagation of the vibration to the same when an external impulse is given. By selecting the attitude as described above in the mounting, the effect of the vibration on the optical waveguide element in the optical waveguide device can be reduced to a certain degree, however small it may be.

Of the above described embodiments, the embodiments under the category (B) designed to restrain the optical waveguide element from resonating (fourth embodiment to eleventh embodiment) are based on the concept to trim the resonant frequency by suitably selecting the thickness or shape of the optical waveguide device or the member to which the optical waveguide device is fixed. A simulation made by us using simple models related to the sixth embodiment and eleventh embodiment will be described below.

Figure 14A:
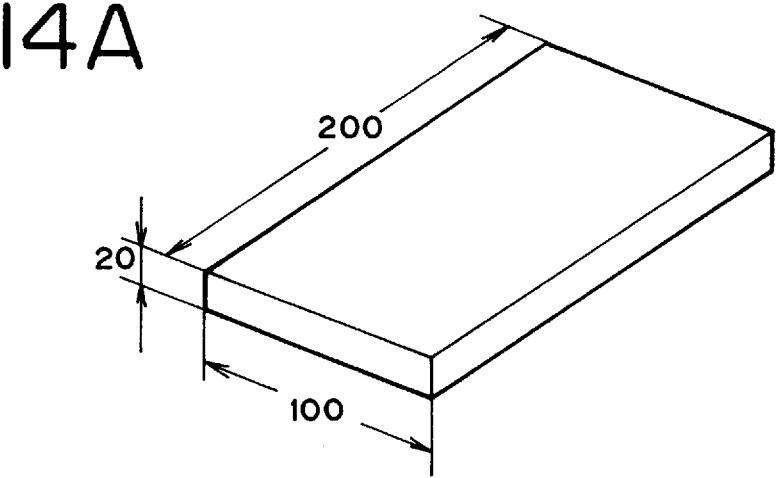
FIGS. 14A–14C are diagrams showing models used in simulation of resonance characteristics.
Figure 14B:
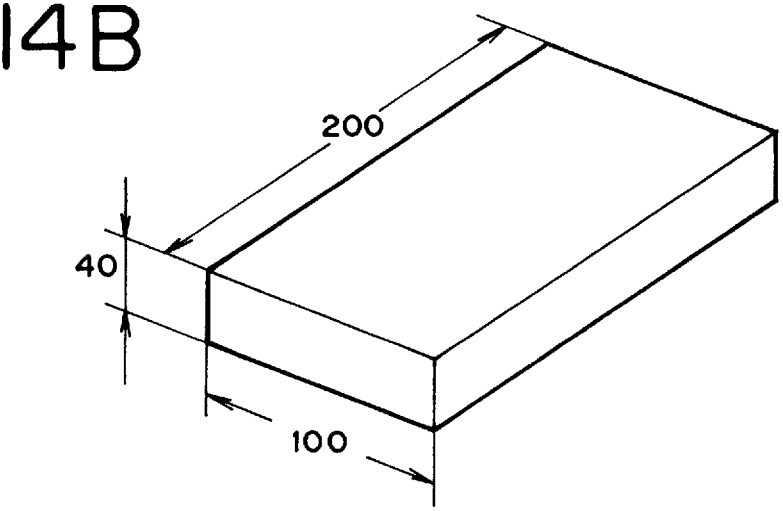
Figure 14C:
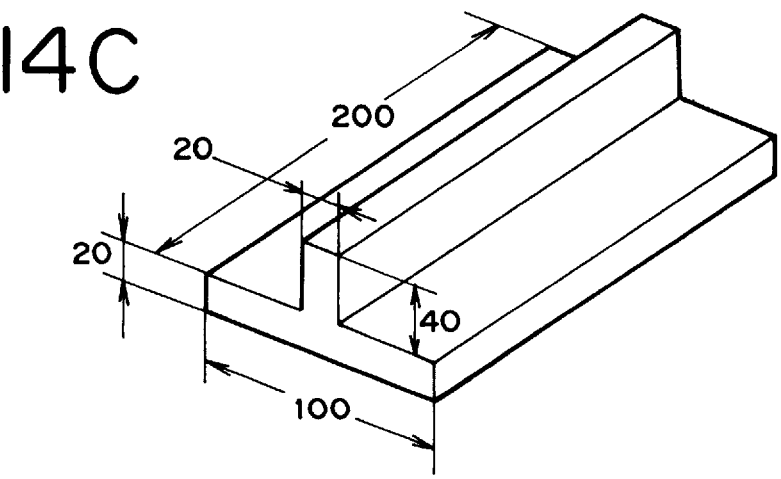

FIGS. 14A–14C are diagrams showing the model used in the simulation. FIG. 14A shows a board of a size of 20 mm×100 mm×200 mm. FIG. 14B shows a board having a thickness twice as large as that of the board shown in FIG. 14A, i.e., of a size of 40 mm×100 mm×200 mm. FIG. 14C shows a board obtained by forming a deadweight (projection) of a size of 20 mm×40 mm×200 mm integrally with the board shown in FIG. 14A. The relationship of FIG. 14B to FIG. 14A corresponds to that of the sixth embodiment to a conventional art example and the relationship of FIG. 14C to FIG. 14A corresponds to that of the 11th embodiment to the conventional art example.

Figure 15:
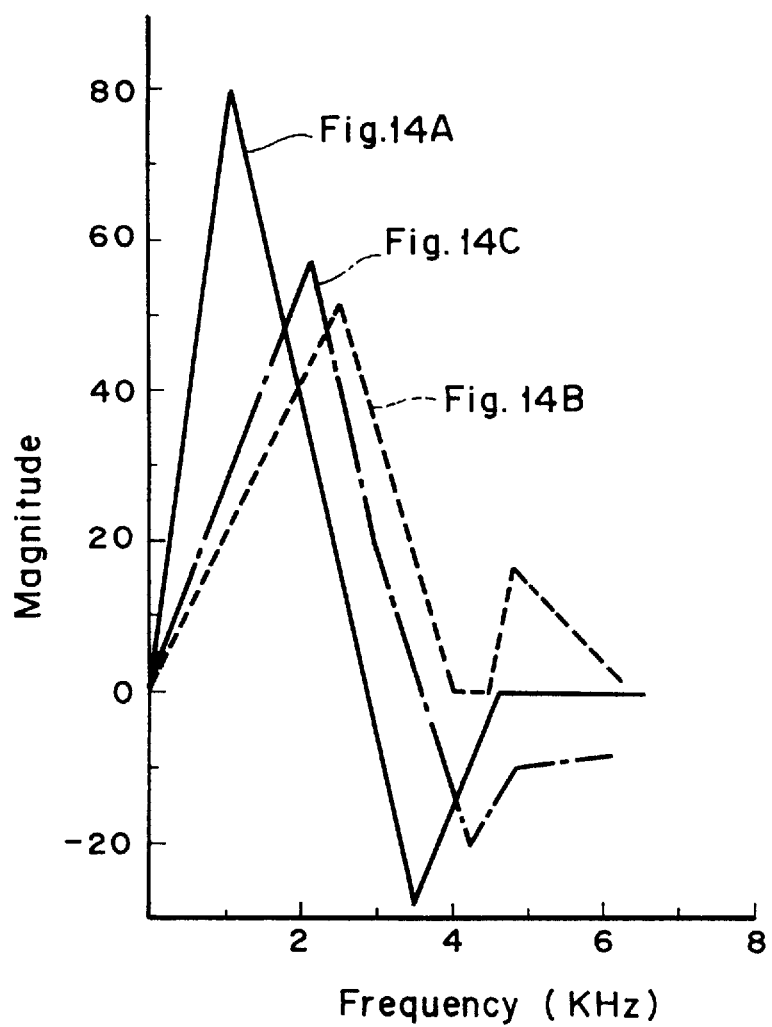
FIG. 15 is a graph showing results of the simulation of resonance characteristics.

FIG. 15 shows resonance characteristics of models shown in FIGS. 14A–14C when they are assumed to be made of the same material. The axis of ordinates represents amplitude (in arbitrary unit) and the axis of abscissas represents frequency. It is known from FIG. 15 that the frequencies providing the maximum amplitude (resonant frequency) for the model of FIG. 14B and the model of FIG. 14C are shifted to the side of higher frequencies from that for the model of FIG. 14A and, further, the maximum amplitudes are decreased. As proven by the simulation, by suitably selecting the shape of the board or the like, the optical waveguide element can be restrained from resonating.

As described in the foregoing, the invention has been designed so that the vibration amplitude of the optical waveguide element itself may be decreased, the optical waveguide element may not resonate, or a vibration due to impulse or the like is attenuated and restrained from reaching the optical waveguide element. Therefore, such a meritorious effect can be obtained that even if a vibration due to an impulse or the like is given, the deterioration in the characteristics of the optical waveguide element can be reduced to the minimum.

What is claimed is:

1. An optical waveguide device comprising:

an optical waveguide element produced by forming an optical waveguide on the surface of a dielectric crystal substrate; and an element housing having said optical waveguide element fixed to an inner wall thereof with the entire rear surface of said optical waveguide element uniformly attached to the inner wall with an adhesive, wherein said element housing includes a wall having a thickness which has a resonant frequency different from a resonant frequency of said optical waveguide element.

2. The optical waveguide device of claim 1, further comprising:

a fixing plate having a thickness so that the fixing plate has a resonant frequency different from a resonant frequency of said optical waveguide element, said fixing plate sandwiched between said optical waveguide element and said inner wall of said element housing, fixing said waveguide element to said inner wall of said element housing.

3. The optical waveguide device of claim 1, further comprising:

a device mounting board having said element housing mounted on a surface thereon.

4. The optical waveguide device of claim 3, wherein said device mounting board has a thickness so that said device mounting board has a resonant frequency different from a resonant frequency of said optical waveguide element.

5. The optical waveguide device of claim 3, wherein:

said device mounting board includes at least one groove so that said device mounting board has a resonant frequency different from the resonant frequency of the optical waveguide element.

6. The optical waveguide device of claim 3, further comprising:

a deadweight fixedly attached to said element housing.

7. The optical waveguide device of claim 3, further comprising:

a deadweight; wherein said element housing is fixed to a first surface of said device mounting board and said deadweight is fixed to a second surface of said device mounting board.

8. The optical waveguide device of claim 3, further comprising:

an elastic member, having a damping effect, fixing said element housing to said device mounting board.

9. The optical waveguide device of claim 3, further comprising:

a plurality of screws, formed of an elastic material having a damping effect, fixing said element housing to said device mounting board.

10. The optical waveguide device of claim 3, further comprising:

a plurality of screws and washers, said washers formed of an elastic material having a damping effect, said plurality of screws and washers fixing said element housing to said device mounting board.

11. The optical waveguide device of claim 3, further comprising:

an apparatus housing, having said optical waveguide device mounted at an edge of said optical waveguide device.

12. The optical waveguide device of claim 3, wherein said element housing is attached to said device mounting board at an attitude such that propagation of a vibration due to an external impulse is minimized.

13. The optical waveguide device of claim 1, wherein said element housing includes a first wall having at least one groove formed in said first wall.

14. The optical waveguide device of claim 13, wherein said first wall includes grooves formed on an outer surface of said first wall.

15. The optical waveguide device of claim 13, wherein a plurality of grooves are formed on outer surfaces of a plurality of walls of said element housing, wherein shapes and a number of grooves are selected so that said element housing does not resonate at the frequency of the optical waveguide element.

16. The optical waveguide device of claim 1, further comprising:

a deadweight fixedly attached to said element housing.

* * * * *